July 25, 1933.  A. MOORHOUSE  1,920,098
HYDRAULIC SHOCK ABSORBER
Filed July 16, 1928
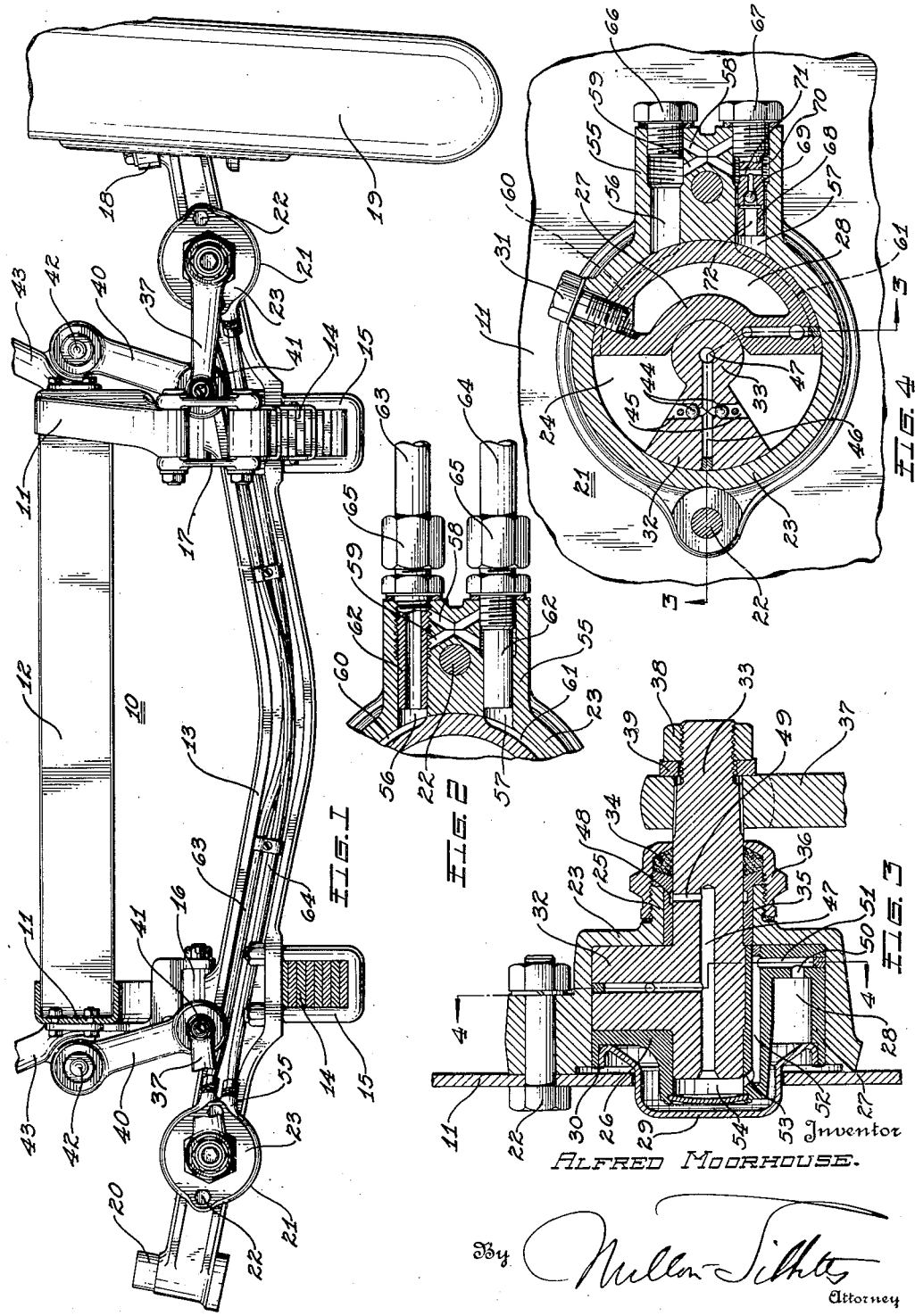
Inventor
ALFRED MOORHOUSE.
By
Attorney Patented July 25, 1933

1,920,098

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

HYDRAULIC SHOCK ABSORBER

Application filed July 16, 1928. Serial No. 293,125.

This invention relates to hydraulic shock absorbers and more particularly to shock absorbers adapted to be used on motor vehicles between the frame or axle or between other relatively moving parts.

The relatively rapid or violent vertical reciprocatory movement of the front or steering wheels of a motor vehicle occurring at certain vehicle speeds and over certain types of road surfaces, sometimes referred to in the art as "tramping" or "wheel shimmy", may be dampened or entirely eliminated, it has been found, by the use of hydraulic shock absorbers, one mounted near each end of the front axle and operatively connected to the vehicle frame and interconnected by pipe lines or conduits adapted to convey liquid from one shock absorber to the other. The rear wheels of a motor vehicle are ordinarily not subject to tramping or shimmy and the shock absorbers associated with the rear axle are therefore usually not interconnected, but are designed and mounted for separate or independent operation.

Thus a motor vehicle equipped with shock absorbers for both front and rear axles and with the front axle shock absorbers arranged for interconnection, has heretofore been provided, in addition to the usual right and left hand forms, with two different types of shock absorbers, one designed for interconnected operation and the other designed for separate operation. From a manufacturing standpoint the disadvantages of providing a motor vehicle with two different types of shock absorbers in addition to the necessary right and left hand forms will be apparent.

An object of the present invention is to provide a shock absorber that may be readily adapted for interconnected or separate use or operation.

Other objects of the invention will appear from the following description taken in connection with the drawing forming a part of this specification, in which:

Fig. 1 is a view in elevation with parts in section, showing the front end of a motor vehicle embodying the shock absorber of the present invention arranged for interconnected use or operation;

Fig. 2 is a sectional view of part of the shock absorber shown at the left of Fig. 1;

Fig. 3 is a sectional view of the shock absorber arranged for separate operation, the section being taken substantially on line 3—3 of Fig. 4, and Fig. 4 is a sectional view of the shock absorber taken substantially on line 4—4 of Fig. 3.

Referring to the drawing, 10 represents generally the frame of a motor vehicle, one of the side members 11 of which is shown in section and the other in front elevation. The side members are connected by a cross member 12 secured in any suitable manner to the side members. The front axle of a motor vehicle is shown at 13 and the frame is supported on the axle by underslung springs 14 connected to the axle by U-shaped bolts 15. The ends of the springs are connected to the frame, the rear pivoted connection being shown at 16 and the front shackle connection being shown at 17. At the end of the axle 13 are the usual steering knuckles 18 on which are pivotally mounted wheels 19. At the right of Fig. 1 the steering knuckle and wheel are shown, whereas at the left of that figure only the bearing portion 20 of the axle is shown, but it will be understood that both ends of the axle are similar in this respect.

The shock absorber of the present invention is indicated generally at 21 and may be mounted either on the axle of the motor vehicle as shown in Fig. 1 or on one of the frame members such as the side frame member 11 as shown in Fig. 3 and 4. The shock absorber is mounted on the frame or axle by means of bolts 22 engaging the substantially cylindrical casing 23 of the absorber. The casing 23 has a working chamber 24 therein and is provided with a bearing portion 25. The open end of the casing is closed by an inner cover or closure 26 having a preferably integral semi-cylindrical extension 27 fitting into the cylindrical portion of the casing and preferably cored out to form an auxiliary reservoir or reserve tank 28. An outer cover 29 in the form of a substantially cylindrical plate having an annular flange is pressed into the cylindrical portion of the inner cover 26 and both the inner and outer covers are preferably welded in position on the shock absorber casing as indicated at 30. A filling opening for the absorber is provided by aligned passages in the casing and extension 27 of the inner cover and this opening is closed by a plug 31. Both the working chamber and reserve tank are substantially filled with any suitable liquid such as oil or glycerine.

A piston 32 mounted to oscillate in the working chamber 24 has a shaft 33 suitably supported in the casing 23 and inner cover 26. A packing 34 is compressed against the bearing sleeve 35 by a hollow nut 36 threaded on the bearing portion 25. Outwardly of nut 36, shaft 33 is serrated and an arm 37 is mounted on the serrated portion and held thereon by a nut 38 and a lock washer 39. The arm 37 is connected either to the frame or the axle of the vehicle, depending upon whether the absorber is mounted upon the axle or the frame, through a link or connecting rod 40. A joint 41 connects link 40 to the arm 37 and a similar joint 42 connects the link 40 to a suitable bracket 43 secured to the frame or the axle, as the case may be.

Piston 32 is provided with a pair of check valves 44 arranged in opposed passages 45 which communicate with a passage 46 and which in turn connects with a passage 47 in shaft 33. An annular leakage groove 48 is formed in bearing sleeve 35 and a short passage 49 connects this leakage groove with passage 47. Any liquid escaping from the working chamber of the absorber in the direction of bearing sleeve 35 will be caught in the leakage groove 48 and drawn back into the working chamber through passages 49, 47, 46, 45 and past check valves 44 by reason of the suction existing on the receding side of the piston. Liquid may be drawn into the working chamber from the lowermost part of the auxiliary reservoir 28 when needed through connected passages 50, 51, 52, 53, 54, 47, 46, 45 and past check valves 44.

The shock absorber casing is provided with a projecting boss 55 having spaced passages 56 and 57 arranged with their axes parallel and substantially normal to the axis of the shaft 33. The passages 56 and 57 are connected near the outer end of the boss 55 by means of intersecting passages 58 and 59, and passage 56 is connected with the working chamber 24 of the shock absorber on one side of the piston by means of an arcuate groove 60 in the cylindrical portion of extension 27 and passage 57 is similarly connected with the working chamber on the opposite side of piston 32 by means of an arcuate passage 61 in the extension 27.

The shock absorber structure thus far described is common to both forms of the absorber, that is, the structure is the same whether the absorber is adapted for interconnected operation or whether it is adapted for separate operation or use. It will, of course, be understood that to adapt the absorber for either right or left hand use a mere reversal of the elements of the absorber structure is necessary.

To adapt the shock absorber for interconnected use or operation, connections in the form of thimbles 62 are threaded into the outer ends of passages 56 and 57. These thimbles are then connected by suitable pipe lines or conduits 63 and 64 by means of the nuts 65 threaded on the projecting ends of the thimbles 62, or otherwise, so that the passage 56 of each absorber will be connected to the passage 57 of the other absorber. It will be noted that the inner ends of the thimbles 62 completely fill the passages 56 and 57 as a result of which the intersecting passages 58 and 59 are rendered ineffective for connecting passages 56 and 57. With this arrangement, the liquid in the working chamber is by-passed from one side of the piston of one shock absorber to the other side of the piston of the other shock absorber and vice versa, as a consequence of which any tendency of the axle of the vehicle to move in non-parallel relation with respect to the frame resulting in tramping or wheel shimmy will be dampened or entirely eliminated.

In order to adapt the shock absorber for separate use or operation, the outer end of one of the passages, for example passage 56, is preferably plugged by means of a plug 66 threaded thereinto. The shank of plug 66 is preferably relatively short so that when the plug is turned up tight in the boss the shank does not cover or restrict the inner end of passage 58. The other passage 57 in the boss 55 has threaded thereinto a plug 67 provided with a metering portion 68 having a check valve 69. The plug is also provided with a reduced portion 70 having a transverse passageway 71 communicating with the axial passage 72 in the metering portion of the plug. The reduced portion 70 of the plug is preferably so positioned that when the plug is turned up tight in the boss 55 the reduced portion will be positioned at the inner end of the connecting passage 59. With this arrangement, movement of the axle toward the frame of the vehicle will only be resisted to a relatively small extent since the liquid is by-passed relatively freely from one side of the piston to the other through passages 60, 56, 58 and 59, past the metering portion 68 of the plug 67 as well as through passage 71 and past check valve 69 into the passage 61 to the working chamber on the other side of the piston. However, on the rebound, or upon tendency of the axle to move away from the frame of the vehicle, movement of the liquid from one side of the piston to the other will be resisted to a relatively greater extent due to the action of the check valve 69, which closes the passage 72 and forces the liquid to pass through the restricted portion of the passage around the metering portion 68 of plug 67.

With this arrangement it will be apparent that a shock absorber has been provided that may readily and very easily be adapted either for interconnected or separate use or operation. This adaptation may be effected, or a change made from the type adapted for interconnected use to the type adapted for separate use by the mere change of the fittings heretofore described and adapted to be threaded into a readily accessible boss provided on the absorber casing. This arrangement necessitates only the provision of right and left hand forms of the shock absorber instead of the provision of two separate types in addition to the necessary right and left hand form ordinarily provided.

The form of the invention shown and described is to be considered as a preferred form only and it is to be understood that the invention is limited only by the scope of the appended claims.

Having thus described the invention, what is claimed and desired to be secured by Letters Patent is:

1. A shock absorber comprising a casing having a working chamber, a piston movable in the working chamber, the casing having passages communicating with the working chamber, the passages being adapted to receive fittings whereby the shock absorber may be adapted for interconnected or separate operation.

2. A shock absorber comprising a casing having a working chamber, a piston movable in the working chamber, the casing having interconnected passages communicating with the working chamber, the passages being adapted to receive fittings whereby the shock absorber may be adapted for interconnected or separate operation.

3. A shock absorber comprising a casing having a working chamber, a piston movable in the working chamber, the casing having interconnected passages communicating with the working chamber at opposite sides of the piston, the passages being adapted to receive fittings whereby the shock absorber may be adapted for interconnected or separate operation.

4. A shock absorber comprising an outer casing having a working chamber, a piston movable in the working chamber, passages in the outer casing, an inner casing having passages connecting the passages in the outer casing and the working chamber, the passages in the outer casing being adapted to receive fittings whereby the shock absorber may be adapted for interconnected or separate operation.

5. A shock absorber comprising an outer casing having a working chamber, a piston movable in the working chamber, passages in the outer casing, an inner casing having grooves forming passages between the inner and outer casings and connecting the passages in the outer casing and the working chamber, the passage in the outer casing being adapted to receive fittings whereby the shock absorber may be adapted for interconnected or separate operation.

6. A shock absorber comprising a casing having a working chamber, interconnected passages in the casing communicating with the working chamber and a plug for one of the passages having a metering portion spaced from the walls of the passages and having a check valve in the metering portion.

7. A shock absorber comprising a casing having a working chamber, interconnected passages in the casing communicating with the working chamber, and plugs for both of the passages, one of the plugs having a check valve.

8. A shock absorber comprising a casing having a projecting boss, a working chamber in the casing, a piston movable in the working chamber, and a plurality of interconnected passages in the boss each communicating with the working chamber, each of the passages having a plug at one end thereof, one of the plugs having a metering portion and a check valve.

9. A shock absorber comprising a casing having a working chamber adapted to contain fluid, a piston movable in the working chamber, a cover associated with the casing forming a wall of the working chamber, said cover having ducts therein communicating with opposite ends of the chamber, and means separate from the cover for connecting said ducts.

10. A shock absorber comprising a casing having a working chamber adapted to contain fluid, a piston movable in the chamber, a cover associated with the casing forming a wall of the working chamber, said cover having ducts therein communicating with opposite ends of the chamber, and means in said casing connecting said ducts.

11. A shock absorber comprising a casing forming a working chamber adapted to contain fluid, a piston movable in the chamber, a cover associated with the casing forming a wall of the working chamber, said cover having ducts communicating with opposite ends of the chamber, said casing having a passage connecting said ducts, and metering means in the passage.

12. A shock absorber comprising a casing having a working chamber adapted to contain fluid, a piston movable in the working chamber, and a cover associated with the casing enclosing the working chamber, said casing and cover jointly providing duct means communicating with opposite ends of the working chamber and said casing having a passage connecting the duct means.

13. A shock absorber comprising a casing, a cover for said casing, said cover and casing providing a chamber adapted to contain fluid, a piston movable in the chamber, and duct means extending partially in said cover and partially in said casing for establishing communication between opposite ends of the working chamber.

14. A shock absorber comprising a casing, a cover for said casing, said cover and casing providing a chamber adapted to contain fluid, a piston movable in the chamber, and metered duct means extending in said casing and said cover for establishing communication between opposite ends of the working chamber.

ALFRED MOORHOUSE.